United States Patent [19]
Jarrett

[11] 3,880,240
[45] Apr. 29, 1975

[54] IMPLEMENT MARKER
[76] Inventor: Larry L. Jarrett, Floydada Rt., Silverton, Tex. 79257
[22] Filed: Apr. 11, 1974
[21] Appl. No.: 459,881

[52] U.S. Cl. .................................. 172/131; 111/33
[51] Int. Cl. ..................... A01b 17/00; A01b 25/00
[58] Field of Search ...... 172/126, 130, 131; 111/33; 171/6; 74/25, 89, 202

[56] References Cited
UNITED STATES PATENTS

| 181,922 | 9/1876 | Dolenty | 172/126 |
| 189,008 | 3/1877 | Zimmerman | 172/131 |
| 568,534 | 9/1896 | Huff | 172/131 |
| 3,736,990 | 6/1973 | Rogers | 172/131 |
| 3,833,066 | 9/1974 | Hitt | 172/131 |

Primary Examiner—Edgar S. Burr
Assistant Examiner—Paul T. Sewell
Attorney, Agent, or Firm—Dorsey L. Baker

[57] ABSTRACT

The disclosure relates to a row marker for an agricultural implement. It comprises at least one elongated bar which is mounted for reciprocal movement between a retracted position overlying the implement and an extended position in which a guide line or mark is made in the unworked ground to subsequently guide the tractor operator. To create the guide line, a marking tool is carried at the extended end of the bar. The disclosure also includes a hydraulic actuated, friction drive assembly to effect selective extension and retraction of the row marker between a marking and non-marking position.

10 Claims, 8 Drawing Figures

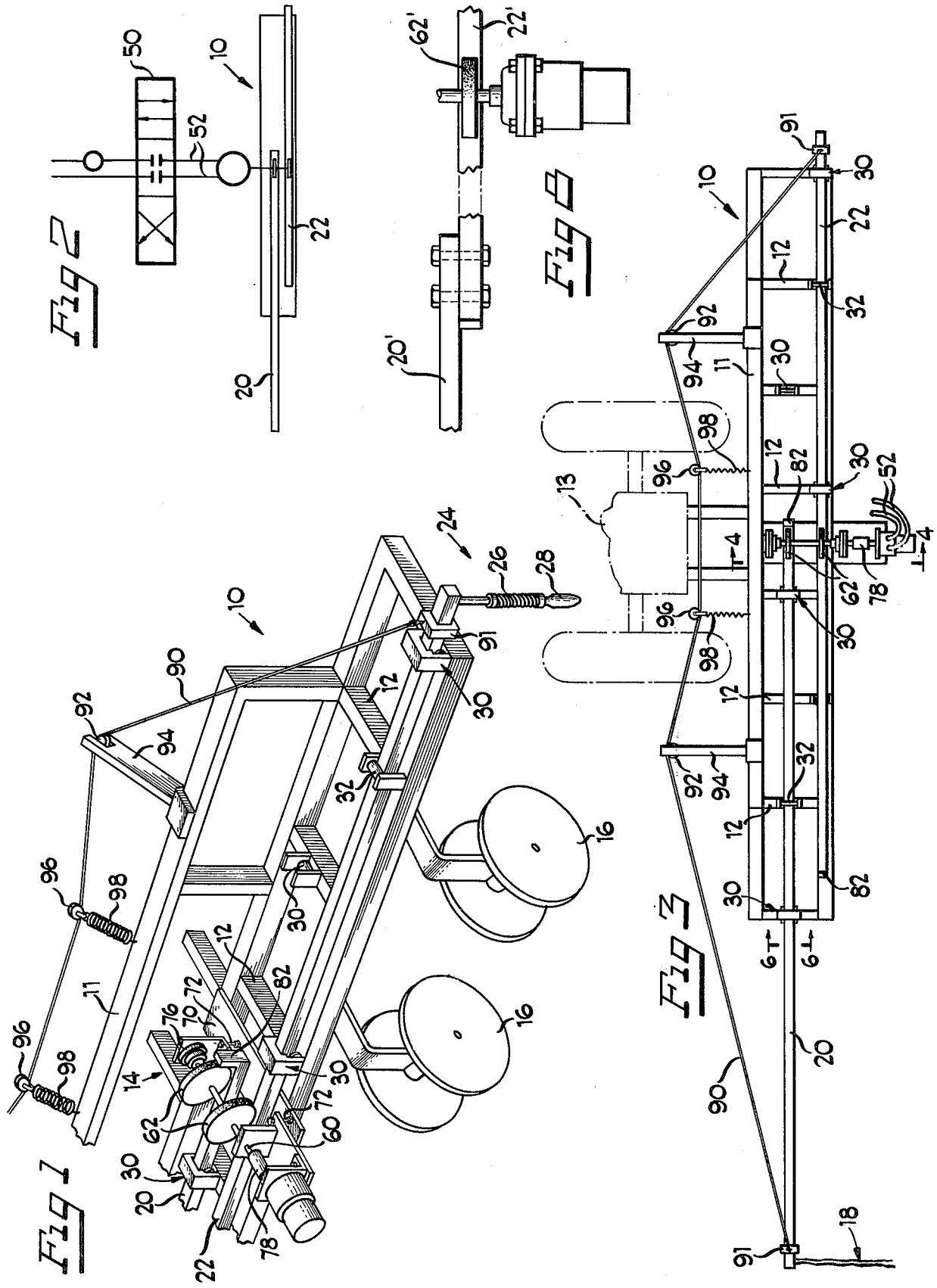

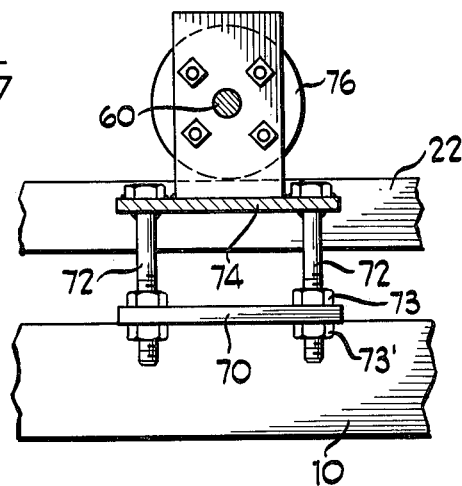
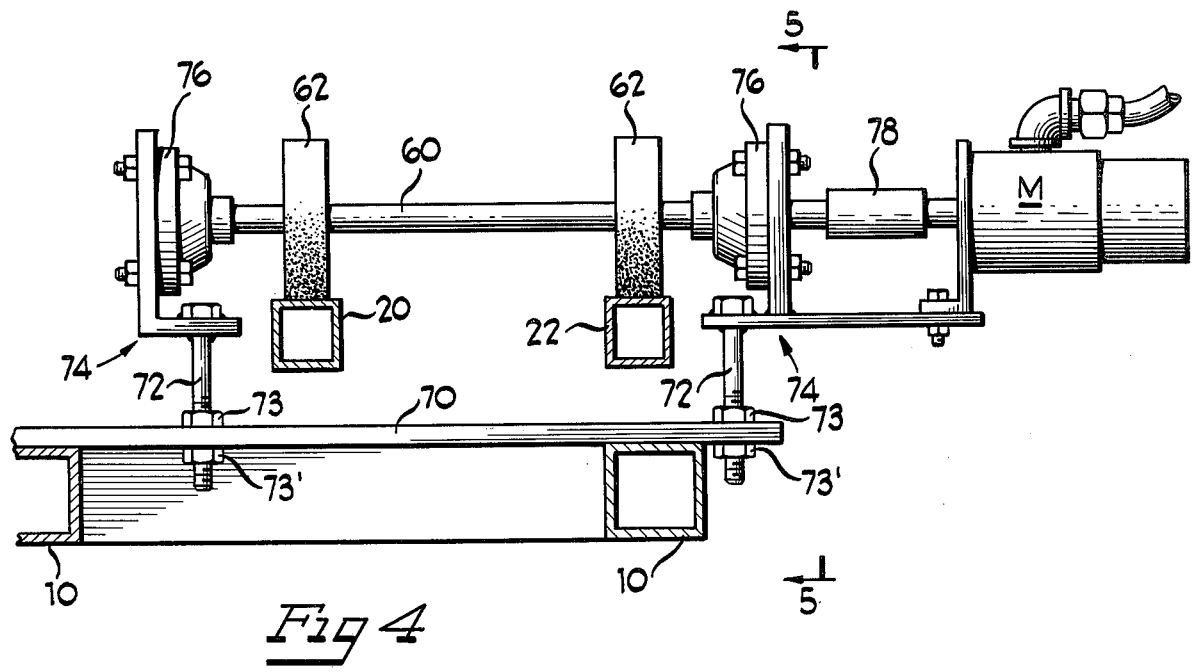
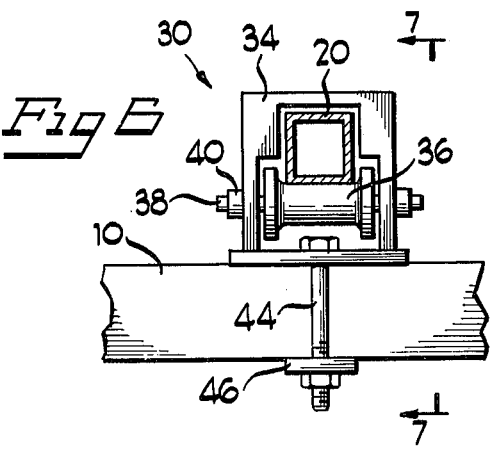
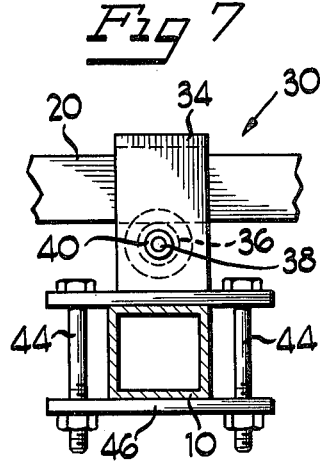

IMPLEMENT MARKER

BACKGROUND OF THE INVENTION

The invention relates to markers for agricultural tractors and implements. In farm operations, such as bedding, the tractor operator must insure that each set of beds or rows formed by the implement are straight, parallel and properly spaced adjacent the next set. Too, in planting many crops, where previously formed beds are not used, the operator must insure that each set of planting furrows are properly spaced and do not overlap.

To accomplish proper spacing, various types of markers have been used. These markers generally extend from one side of the tractor or implement and carry a tool to engage and mark a line in the unworked ground. This line usually represents the position for the center line of the tractor or one of the wheels when the operator turns the tractor 180° to plant or bed rows in the opposite direction. Upon turning, the row marker must be placed on the opposite side of the tractor to extend into the unworked soil.

With large equipment, such as eight row disc bedders, the implement's width is approximately 26 feet wide. Thus, the marker must alternatively extend approximately 13 feet from each extremity of the implement. Markers primarily utilized prior to my invention have generally comprised pivotal arms extending from each side of the implement. These units are alternatively raised and lowered between a generally vertical position and horizontal marking position by hydraulic cylinders. Such devices present problems. In the elevated position, they may engage utility or telephone lines. Too, the operator must stop or slow down his tractor while alternatively raising and lowering these units. Finally, due to the length of the markers, unusually high stresses are placed on the pivot members causing repair problems.

Other markers known in the prior art utilize cables to shift the markers from one side of the implement to the other, with rams or rotary hydraulic motors applying force to the cables. However, the cable connection to the markers and the motors often permit slippage and lack the desired reliability. Too, frictional forces involved in the alternating movement of these markers to opposite sides of the implement affect their reliability and result in maintenance problems.

SUMMARY OF THE INVENTION

In providing an improved marker, the preferred embodiments of the instant invention includes at least one elongated bar member reciprocally mounted on a support or an implement tool bar attached to the tractor by the conventional 3 point hitch. Carried on at least one end of the bar is a tool for engaging the ground and making a sighting line to guide the operator on the next round. A hydraulic actuated, friction drive assembly is utilized to reciprocate the bar member from an extended, marking position to a position in juxtaposition with the implement. Preferably, two separate bar members are used, each being extendible on opposite sides of the implement. Alternatively, a single bar having greater length may be used. In this instance, the single bar would reciprocate such that its ends would extend beyond opposite ends of the implement.

Accordingly, it is an object of my invention to provide a row marker for implements which utilize a positive, friction drive assembly in conjunction with elongated bars which are selectively moved from a travel position overlying the support or tool bar to a marking position. Another object of my invention to provide a marker assembly which is free of construction, maintenance and stress problems and primarily utilizes low friction, vertical support members to interconnect the marker to the implement tool bar or support. The preferred embodiments are also intended to provide a positive, reliable marking system, free of failures of the unit to properly extend the required distance. Finally, it is an object of my invention to provide a marker assembly which can easily be adapted for road travel in which it does not extend beyond the width of the implement tool bar, thus eliminating a safety hazard.

DESCRIPTION OF THE DRAWINGS

The manner in which these and other objects of the invention are obtained is depicted in the drawings in which:

FIG. 1 is a perspective view of a portin of a preferred embodiment of my invention;

FIG. 2 is a symbolic view of a preferred embodiment of my invention depicting a hydraulic circuit and drive assembly;

FIG. 3 is a plan view of a preferred embodiment of my invention;

FIG. 4 is a side elevational view taken along the lines 4—4 of FIG. 3;

FIG. 5 is a side elevational view taken along the lines 5—5 of FIG. 4;

FIG. 6 is a side elevational view taken along the lines 6—6 of FIG. 3;

FIG. 7 is a side elevational view taken along the lines 7—7 of FIG. 6; and

FIG. 8 is a plan view of one alternative embodiment of my invention.

DETAILED DESCRIPTION

In FIGS. 1 and 3, a preferred embodiment of my invention is depicted in association with a tool bar or implement support 10 connected to the tractor 13 by a hitch 14. This tool bar is generally rectangular and is approximately 26 feet wide for conventional eight row equipment. Along its forward side is an elongated vertical standard 11 to which is connected the upper link of a hydraulically actuated three point hitch assembly, the details of which are omitted. Cross supports 12 extend between opposite sides of the tool bar to provide strength and rigidity. As shown, the elongated tool bar 10 carries a plurality of ground engaging tools such as discs 16 to constitute what is conventionally known as a disc bedder which forms a plurality or set of 6, 8 or more rows or planting beds.

In order to insure each set of rows is parallel and spaced adjacent the prevously formed set, an indicating mark 18 is formed in the ground by a row marker. This mark usually indicates the center line of the tractor after it has turned 180° to form the adjacent set of rows. Thus, the marking device must be shifted to opposite sides of the tool bar upon each 180° turn of the tractor.

To accomplish this shifting, and to provide maintenance free operation of the marker, the preferred embodiment of the instant invention comprises two elongated members 20 and 22 (usually in the form of a rectangular steel bar) which are mounted upon tool bar 10 for relatively friction free reciprocal movement. Each of these bars (20 and 22) have approximately the same length as the tool bar. On the outside end of these members is mounted a marking device 24 comprising a relatively rigid spring 26 carrying a marking tool 28, which creates the mark 18 in the unworked ground.

The exact structure of the friction free guides supporting the marking members for reciprocal movement may take many forms. Such guides may comprise bearing mounted rollers. I have found it desirable to utilize three upwardly supporting rollers 30 and one downward acting roller 32 for each bar appropriately spaced on the tool bar 10. Preferably, at least two of the upwardly supporting rollers 30 take the form of encapsulating guides shown in FIGS. 6 and 7. Here, the guide comprises a generally rectangular housing 34 carrying a roller 36 journaled by anti-friction bearings (not shown) between opposite sides of the housing by a shaft 38. Collars 40 lock the shaft within the housing. The upper portion of the housing 34 is formed to closely surround and guide the bar 20 or 22 upon reciprocation. The bottom plate of housing 34 is then mounted upon the cross support 12 by two bolts 44 extending downwardly about each side of the cross support to engage a locking plate 46. The remaining guides may merely comprise rollers mounted between vertical plates as shown in FIG. 1. The number and type of anti-friction guides 30 and 32 will depend on the width of the tool bar and the strength and size of the marker bars 20 and 22.

After the guides 30 and 32 are attached to the tool bar 10, the marker bars are inserted therein for reciprocal movement. As shown in FIG. 3, the bars are positioned for alternative retraction and extension within the rollers 30 and 32. Thus, the bar 20 is shown in the extended marking position while bar 22 is in the retracted position such that the marking tool 24 does not interfere with beds previously formed on the right side of the tractor as viewed in FIG. 3.

As soon as the tractor operator reaches the end of the field to turn around, the marker bar 20 is retracted and bar 22 is extended by reciprocating them through the anti-friction guides. The marked bar 22 is then in the extended marking position. This reciprocation is effected by a rotary hydraulic drive assembly, more thoroughly depicted in FIGS. 2, 4 and 5.

With reference to FIG. 2, the drive assembly comprises a two directional hydraulic motor M to which fluid power is supplied by the tractor through a three position directional control valve 50 and hydraulic hoses 52 connected to the motor. As shown in FIGS. 3 and 4, the drive shaft of the motor M is connected to a power shaft 60 which has two friction drive wheels or rollers 62 mounted upon and constrained for rotation therewith. These rollers 62 are provided with a high friction surface and are in frictional driving contact with the bars 20 and 22. Obviously, these drive wheels could also be utilized as a partial substitute for support rollers 30 and 32 if located underneath the marker bars. Thus, manual actuation of the directional control valve 50 in one direction will cause rotation of motor M in a selected direction to simultaneously move bars 20 and 22 in one direction causing one to extend and the other to retract with respect to the tool bar 10. Actuation of valve 50 in the opposite direction causes the marker assembly to shift in the opposite direction.

The hydraulic drive assembly may be mounted on the tool bar 10 by various supporting arrangements. As shown in FIGS. 4 and 5, a flat cross bar 70 extends between and is welded to opposite sides of the tool bar 10. Mounted by bolts 72 extending through this cross bar 70 are two bearing supports 74 which comprise horizontal and vertical plates as shown. The vertical plates of supports 74 mount two pillow bearings 76 which journal the shaft 60 in alignment with the drive shaft of the Motor M, the two shafts being constrained for rotation by a coupling 78. Further, the right support 74 as viewed in FIG. 4 extends outwardly to mount the motor M as shown. To obtain a rigid support of the drive assembly, the bearing supports 74 are welded to the bolts 72. The detailed construction of the support assembly shown in FIGS. 4 and 5 is quite satisfactory. However, such may take many different forms, as will be recognized by those skilled in the art.

To positively insure that the marker bars 20 and 22 are properly extended upon actuation, upstanding shoulders 82 may be affixed to the ends thereof in any conventional manner. Thus, when the valve 50 is shifted in one direction, the motor will rotate until the drive rollers 62 engage the stops 82. Further, to insure that the marking tool 24 of the retracted bar does not drag and affect rows previously formed, its inward movement may be limited such that the tool 24 is carried in the middle of two previously formed rows.

After reciprocation of the bars 20 and 22, the engagement of the marker tool 28 may cause the bar to flex due to the long unsupported length of approximately 13 feet or one-half the length of the tool bar. To minimize such flexing and to stabilize the bar, the outside ends are interconnected by a cable 90 through brackets 91. This cable then passes through a pulley wheel 92 on each of two support arms 94 extending upwardly from tool bar 10 at approximately at 45° angle. The cable also extends through two pulley wheels 96 carried on two tension springs 98 also attached to the tool bar 10. Thus, the cable exerts an upward, forward force upon the extended end of the marker bars.

In operation of the tractor, the driver merely lowers the hydraulic three point hitch which lowers the implement to a working position. With one of the markers already being extended, it will mark a line in the soil for the next round. At the end of the field, the driver will actuate one valve to raise the hydraulic actuated hitch and implement and simultaneously actuate valve 50 in the proper direction to shift the marker assembly to the opposite side of the implement. Fluid pressure then drives the motor M and friction wheels 62 to shift the marker bars through vertical support rollers 30 and 32. Such occurs while the operator is turning the tractor. Upon completion of the turn, he then lowers the hitch and implement, and the opposite marker bar will be in extended position.

When the bedding operation is completed, the operator may be required to travel on roads or highways to other farms. To preclude the overhang of the marker bars during such travel, the instant invention includes means for simultaneous retraction of both bars to the travel position. Referring to the drive assembly support in FIG. 5, it will be seen that the bolts 72 are connected to flat plate 70 by nuts 73 and 73' above and below the plate. Thus, by rotating these nuts in one direction, either of the supports 74 can be elevated. Such elevation will raise the drive wheels 62 off of the bars 20 or 22 such that they can be manually pushed into a safe non-extended travel position overlying tool bar 10.

Another embodiment of my invention is disclosed in FIG. 8. Here only a single marker bar 20' and a single drive wheel 62' are utilized. However, its length is approximately 1½ times that of the tool bar 10 and is made in sections and bolted together as shown to permit disassembly during highway travel. This singel bar would be provided with a marker device 24 at each end, and two stops (not shown) such as that depicted by numeral 82 would be attached to the same bar 20'.

Accordingly, the instant invention provides a friction free, positive friction drive assembly readily adopted for use with conventional tool bars and tractors. Many modifications within the scope of my invention will be apparent and include various modifications and relocations of the supporting structures and drive assemblies.

I claim:

1. A row marker apparatus for a farm implement comprising:
   a. anti-friction guide means mounted upon said implement for reciprocally mounting two elongated marker members;
   b. two elongaged marker members each mounted in said guide means for reciprocation from a retracted position in juxtaposition with said implement to an extended position on a side of said implement;
   c. a marker element depending from the extendible end of each of said marker members for engaging the soil and providing an indicating mark when said members are in an extended position;
   d. hydraulically actuated friction drive means carried by said implement said drive means including a support assembly affixed to said implement, said support assembly journalling friction drive roller means for frictionally engaging a substantially smooth surface of said marker members and for extending and retracting said marker members between the extended marking position and a retracted position in juxtaposition with said implement; and
   e. said support assembly includes release means for releasing the frictional engagement between said roller means and said marker members for manually positioning said marker members.

2. An apparatus as recited in claim 1 in which:
   a. one of said marker members is initially mounted in said guide means in an extended position and the other is initially mounted in a retracted position; and
   said roller means includes two friction rollers each engaging one of said marker members and being constrained for rotation with a rotary hydraulic motor, actuation of said motor reciprocating said markers to simultaneously extend the marker in the retracted position and to retract the marker in the extended position to provide an indicating mark on the opposite side of the implement.

3. A row marker for a farm implement comprising:
   a. at least one elongated bar having a marking tool on at least one end for engaging the soil and for providing an indicating mark therein;
   b. anti-frictional guide means carried by said implement mounting said elongated bar for reciprocal movement across said implement; and
   c. friction drive means including a hydraulic motor drivingly connected to a friction roller frictionally engaging with a substantially planar surface of said bar for reciprocating said marking tool to a marking position on one side of said implement or to a retracted position adjacent said implement.

4. An apparatus as recited in claim 3 in which:
   a. said elongated bar is longer than said implement and carries a marking tool on each end.

5. An apparatus as recited in claim 3 in which said marker comprises:
   a. two bars which are reciprocated between an extended position on opposite sides of said implement and a retracted position, each of said bars carrying a marking tool on its extendible end.

6. An apparatus as recited in claim 4 in which said marker includes:
   a. bar supports carried by said implement supporting anti-friction rollers; and
   b. flexible cable means interconnecting the extendible ends of said bar, said cable means passing over said anti-friction rollers to provide vertical, forward support to said ends of said bar.

7. An apparatus as recitd in claim 6 in which said apparatus includes biasing means for resiliently applying tension in said cable.

8. A row marker comprising:
   a. an elongated support adapted to be mounted on a farm tractor;
   b. at least on elongatd marker member mounted on said support, said member being mounted for reciprocal movement between an extended marking position on at least one side of said support and a retracted position on said support;
   c. a marking tool carried on the end of said member for engaging the ground and providing an indicating mark; and
   d. reversible rotational friction drive means for frictionally engaging a substantially smooth surface of said member, rotation in one direction causing retraction of said member and rotation in the opposite direction causing extension of said member to a marking position.

9. An apparatus as recited in claim 8 in which friction drive means includes:
   a. a hydraulic motor drivingly connected to a friction roller frictionally engaging with a surface of said bar for reciprocating said marking tool to a marking position on one side of said implement or to a retracted position adjacent said implement.

10. An apparatus as recited in claim 8 in which said friction drive means includes:
    a. a support assembly affixed to said implement, said support assembly journalling friction drive roller means for frictionally engaging said marker members and for extending and retracting said marker members between the extended position and a retracted position above said implement; and
    b. said support assembly includes release means for releasing the frictional engagement between said roller means and said marker members for manually positioning said marker members.

* * * * *